US007493285B2

(12) United States Patent
Bouthors (10) Patent No.: US 7,493,285 B2
(45) Date of Patent: Feb. 17, 2009

(54) PAYMENT PROCESS AND SYSTEM FOR TRANSMISSION AND/OR SERVICE OPERATIONS WITHIN A DATA PACKET TRANSMISSION NETWORK

(75) Inventor: Nicolas Bouthors, Meylan (FR)

(73) Assignee: Cegetel Groupe, Meylan (FR)

( * ) Notice: Subject to any disclaimer, the term of this patent is extended or adjusted under 35 U.S.C. 154(b) by 1783 days.

(21) Appl. No.: 09/943,415

(22) Filed: Aug. 30, 2001

(65) Prior Publication Data

US 2002/0052837 A1   May 2, 2002

(30) Foreign Application Priority Data

Sep. 7, 2000   (FR) .................................. 00 11438

(51) Int. Cl.
*G06Q 40/00* (2006.01)
(52) U.S. Cl. .......................................... 705/40; 705/35
(58) Field of Classification Search .................. 705/35, 705/53, 79, 67, 77, 40
See application file for complete search history.

(56) References Cited

U.S. PATENT DOCUMENTS

| 6,088,687 | A | | 7/2000 | Leleu | ........................ | 705/400 |
| 6,938,019 | B1 | * | 8/2005 | Uzo | ............................ | 705/65 |

FOREIGN PATENT DOCUMENTS

GB    2 294 132    4/1994

OTHER PUBLICATIONS

Business Editors. "Aether Enters Electronic Bill Presentment and Payment Market; Partnership with Cyberbills Breaks New Ground for Wireless Electronic Bill Management". Business Wire. New York: Jan. 28, 2000. p. 1.*
Barbetta, Frank. "Internet Billing Starts Ticking". Telephony. Chicago: Jun. 22, 1998. vol. 234, Issue 25; p. 20, 6 pgs.*
M2 Presswire. Nortel Networks: Nortel Networks and HP Form Strategic Alliance to Build Wireless Internet and Deliver Mobile E-Serve; Alliance to Deliver All-in-One Network Solutions that Equip Businesses and Consumers Across the Globe with Anytime, Anywhere Internet Connections. Coventry: Jun. 20, 2000. p. 1.*
"Re HTTP2: caching a copyright" by Dave Raggett, Jan. 11, 1993.
French Search Report of French Appln No. FR 0011438, Jul. 3, 2001.

* cited by examiner

*Primary Examiner*—Lalita M. Hamilton
(74) *Attorney, Agent, or Firm*—Westman, Champlin & Kelly, P.A.

(57) ABSTRACT

The invention concerns payment for transmission and/or service operations within a data packet transmission network (4) (improvement in payment token technology). According to the invention, between the source unit (S) and the destination unit (D), at least one node is used as a cache node (NC) and also behaves like a debit node. It includes a debit gateway (PD) modifying the payment token assigned to each data packet received, so as to reduce the initial value of the payment token, by an amount representing the cost of the at least one cache operation carried out, for the packet received, by the cache node. A manager of said at least one cache node receives from the toll center, for each packet received during the session, the financial settlement of the representative amount and restores it to a manager of said at least one replaced unit or node, or allows a manager of said at least one replaced unit or node to receive the financial settlement directly.

20 Claims, 4 Drawing Sheets

PAYMENT PROCESS AND SYSTEM FOR TRANSMISSION AND/OR SERVICE OPERATIONS WITHIN A DATA PACKET TRANSMISSION NETWORK

FIELD OF THE INVENTION

The field of the invention is that of data packet transmission networks, and particularly, but not exclusively, Internet type networks.

BACKGROUND OF THE INVENTION

Generally speaking, such networks enable sessions to be set up, each one between a source unit and a destination unit, interconnected via one or more network nodes. During each session, the destination unit and/or one or more network nodes carry out transmission and/or service operations. The destination unit and/or the node(s) carrying out the aforementioned operations are used by a network operator and/or a service provider. In the present description, by service provider is hereby also understood a content provider.

By transmission operations are understood data packet transport operations on the network. By service operations are understood every kind of operation related to the container and content of the transmitted data packets. Service operations consist for example of an encryption/decryption of the data contained in the packets, or again of an execution of an executable or interpretable code of a program or program part contained in the packets.

Transmission and/or service operations allow for example audio or video works to be broadcast over the Internet network. In this case, a customer (the source unit, for example) sends to a service provider (the destination unit, for example) a request concerning a given work, and in return the service provider returns to the customer an audio or video data file relating to the given work.

More exactly, the invention concerns the payment (also called the "billing") for these transmission and/or service operations.

In the interests of simplification, the following discussion is mostly concerned with the Internet. It is clear however that the invention is not restricted to this particular type of network and applies more particularly to any type of data packet transmission network.

As explained in detail in patent document WO 9733404 (LELEU), the text of which is inserted here for reference, it seems difficult, if not impossible, to implement conventional payment technologies on the Internet network for operations carried out on the networks. Indeed, the Internet network does not have the centralised administration necessary to implement these conventional payment technologies, which mainly consist of billing as a function either of the length of connection between units (for a pre-set data transmission speed and distance), or of the amount of data exchanged between two units (taking into account the data transmission speed).

For this reason, the current technology of paying for operations carried out on the Internet network consists in billing only for access at a physical point-on the network. As shown in the aforementioned patent document, this billing is either at a flat-rate, or it takes into account the amount of data sent to the whole network, or else the totality of the data received from the totality of the network.

Unfortunately, this current payment technology does not allow fair and equitable billing of transmission and/or service operations carried out within the Internet network. Indeed, currently, the billing of transmission and/or service operations is not a function of the path traversed by and of the transmission speed of the data packets.

Therefore, in patent document WO 9733404 (LELEU), a new technology has been proposed, called "token technology" in the remainder of the description. It is based on the insertion of payment tokens in the packet stream, and allowing each data packet conveyed by the network to settle for itself the cost of a transmission operation relating to its own transport, or the cost of a service operation relating to its own container or content.

Figure 1:
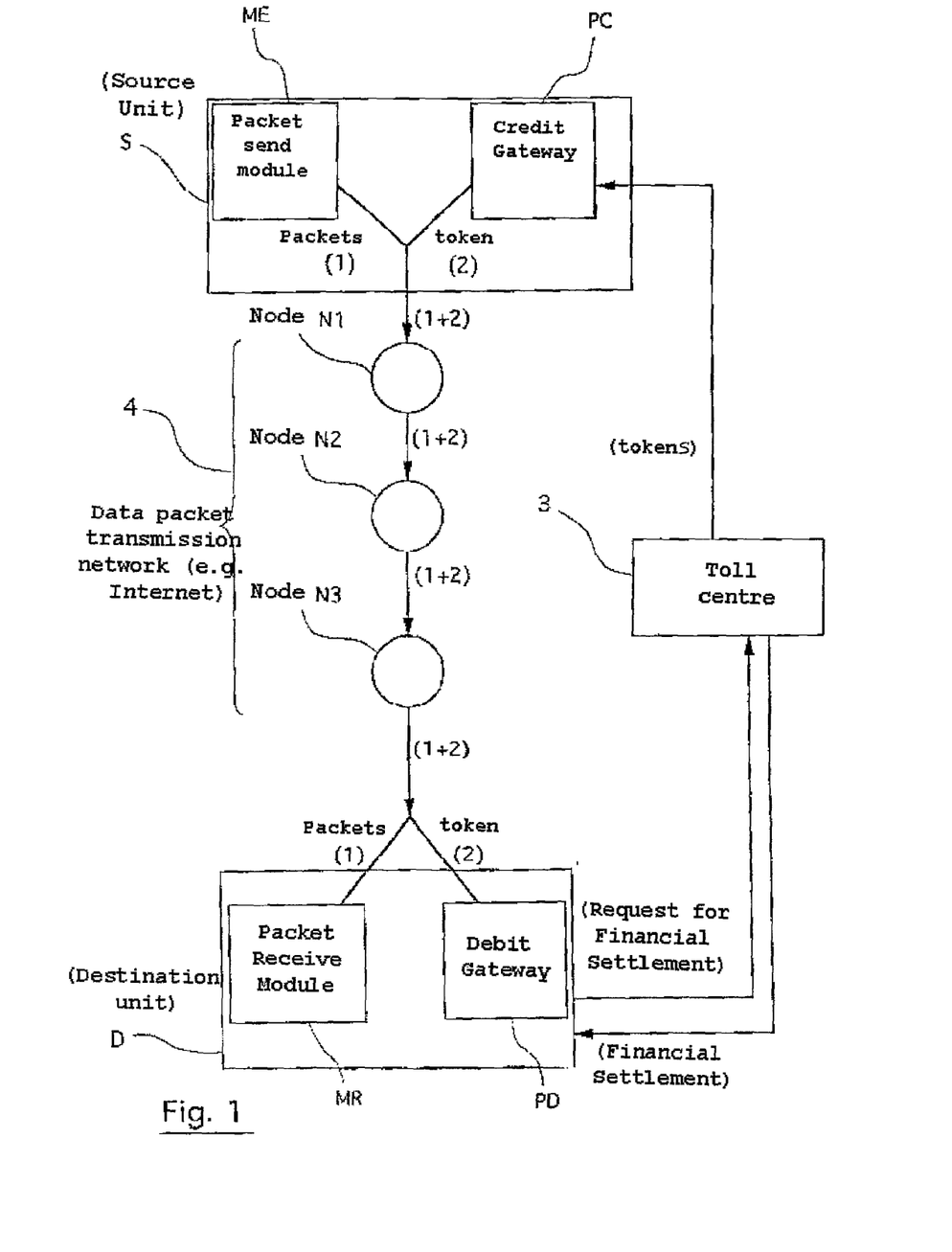
FIG. 1 shows a block diagram of a particular embodiment of the payment process and system of the prior art, implementing token technology.
Figure 2:
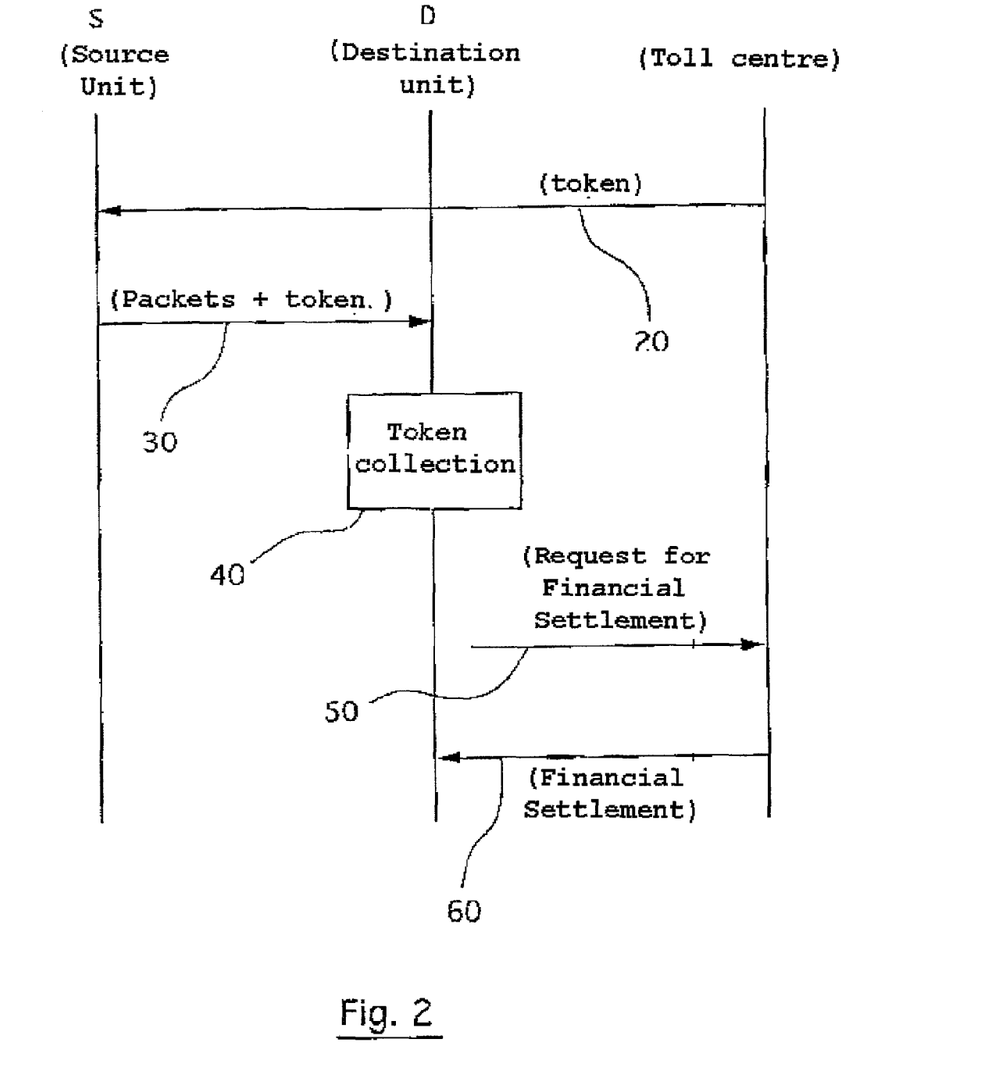
FIG. 2 shows the operation of the particular embodiment of the process and system according to the prior art given in FIG. 1, through the exchanges carried out between the source unit, the destination unit and the toll center.

The general design of this token technology will now be summarised briefly, in relation to FIGS. 1 and 2. The data packet transmission network is for example the Internet network 4. The source unit S (and/or at least one node, called a credit node) includes a packet 1 send module ME and a credit gateway PC. This latter PC assigns to each sent data packet 1 a payment token 2 which has an initial value representing a credit in monetary units previously acquired (20) from a centralising monetary agency (or "Toll Center") 3. Each packet 1 is therefore sent (30) with the payment token 2 which is assigned to it. The destination unit D (and/or at least one node, called a debit node, located downstream of said at least one credit node) includes a packet 1 receive module MR and a debit gateway PD. The latter receives the token assigned to each packet received 1 and modifies it (40) so as to reduce its initial value by an amount representing the cost of the operations to be carried out, for the packet received 1, by the destination unit D (and/or said at least one debit node). Lastly, the destination unit D (and/or each debit node), in which is included a said debit gateway PD, requests from (50) and receives from (60) the toll center 3, for each packet 1 received during the session, financial settlement of the representative amount.

In the remainder of the description, the modification (30) of the payment token by reduction of its initial value, is sometimes also called, more simply, "payment token collection".

In the example shown in FIGS. 1 and 2, only the source unit S includes a credit gateway PC and only the destination unit D includes a debit gateway PD. It is clear however that, in a general way, one or more credit nodes may also (or alternatively) include a credit gateway PC and one or more debit nodes may also (or alternatively) include a debit gateway PD.

In a particular embodiment of this token technology, the source unit is used by an access provider (or ISP, for "Internet Service Provider", or again IAP, for "Internet Access Provider"), so that subscribers to this access provider may access the data packet transmission network. Thus, the credit gateway, which is implemented at the access provider, assigns tokens to the packets (i.e. inserts tokens in the IP streams) of customers accessing some service or other offered by a service provider. A service is for example recognised by its IP address and its port number (the latter identifying to which higher level protocol the request is to be passed). Conventionally, subscribers are connected to their access provider by (at least) one other communication network, such as the switched telephone network ("fixed network", STN) or again a radio-communication network ("mobile network", for example according to the GSM standard).

This token technology has numerous advantages. In particular it allows fair and equitable billing of transmission and/or service operations carried out within a data packet transmission network, for example of the Internet type. It may also constitute an electronic payment means, associated with the content of the packets, in the network nodes. Indeed, the payment token assigned to each data packet makes it possible to finance any type of operation (transport and/or service) carried out by the destination unit or any network node in the which the packet will reside.

However, the token technology has the major drawback of not covering the situation, which is however increasingly frequent, whereby use is made of a cache unit located, within the network, between the unit including the credit gateway (source unit or credit node) and the unit including the debit gateway (destination unit or debit node).

It will be remembered that, conventionally, a cache unit (also called a cache node) stores responses (Web pages, in the case of the Internet) to the most frequent requests to different end sites. Thus, when it receives a request for which it has previously stored the response, the cache unit itself sends the response to the customer sending said request. In this way the number of requests actually passed on to the end sites is restricted, and response times are therefore reduced. Typically, the cache unit is a "Proxy" server.

Token technology makes no provision however in the situation where a cache unit carries out one or more operations on behalf of another unit (destination unit or debit node) located downstream. This means that the debit gateway included in this other unit never receives some data packets (corresponding to requests not passed on to the end sites), and especially does not receive the payment tokens assigned to the latter. In other words, it is impossible at the present time to apply token technology when a cache unit is used.

SUMMARY OF THE INVENTION

The particular objective of the invention is to overcome this major drawback of the prior art.

To be more exact, one of the objectives of the present invention is to provide a payment process and system constituting an improvement on the token technology discussed above, so that the latter may be applied even when a cache unit is used.

Another objective of the invention is to provide such a payment process and system, allowing the replaced unit or node (destination unit or debit node) to be informed about and to control the collection of tokens which are intended for it, even though it does not carry out this collection itself.

Another objective of the invention is to provide such a payment process and system, including a service continuity test mechanism.

These different objectives, and others which will emerge subsequently, are met according to the invention by means of a payment process for transmission and/or service operations carried out within a data packet transmission network, during a session between a source unit and a destination unit interconnected via at least one node of said network, said destination unit and/or said at least one node being used by at least one operator and/or at least one service provider. The process is of the type implementing token technology as mentioned above.

According to the invention, between said source unit and said destination unit, at least one node is used as a cache node, including cache means allowing at least one cache operation to be carried out, on behalf of at least one replaced unit or node, namely said destination unit and/or at least one node, located downstream of said at least one cache node. Furthermore, said at least one cache node also behaves like a debit node, and includes a said debit gateway modifying the payment token assigned to each data packet received so as to reduce said initial value of the payment token, by an amount representing the cost of said at least one cache operation carried out, for said packet received, by said cache node.

Lastly, a manager of said at least one cache node receives from said toll center, for each packet received during said session, said financial settlement of said representative amount and restores it to a manager of said at least one replaced unit or node, or allows a manager of said at least one replaced unit or node to receive directly said financial settlement.

The general principle of the invention therefore consists in including in the cache node a debit gateway which replaces, for the collection of tokens, the debit gateway of the replaced unit or node. A financial settlement of tokens thus collected may be requested from the toll center, to the advantage (directly or via the cache node) of the replaced unit or node.

In this way, the tokens may be collected even though they do not quite reach the replaced unit or node. In other words, the present invention allows token technology to be applied even though a cache unit is used.

Preferentially, at least one probe is placed upstream of said at least one cache node, making it possible to collect, in each packet reaching said at least one cache node, information relating to the amount representing the cost of said at least one cache operation to be carried out, for said packet, by said at least one cache node. Said manager of said at least one replaced unit or node receives said information collected by said at least one probe, so as to get said amount representing the costs of the cache operations carried out by said at least one cache node for each packet received during said session.

In this way, by means of the probe, the owner of the replaced unit or node can control, independently, the collection of payment tokens carried out for him by the cache node. This is particularly advantageous for a service provider wishing to control, independently of the network operator, the collection, carried out upstream, of payment tokens assigned to requests concerning his service but which do not reach him (given that they are processed directly by the cache node).

In a particular embodiment of the invention, said source unit is used by a provider of access to said data packet transmission network, and allows said access to be provided to at least one subscriber to said access provider.

Preferentially, the access provider also assumes the role of manager of the cache node. Indeed, conventionally and particularly in the case of the Internet, the access provider assumes an operator function for a part of the data packet transmission network.

To advantage, each payment token is assigned to a given packet by insertion of said payment token in said packet and/or in at least one higher level encapsulating structure of said packet.

In other words, the payment token assigned to a packet is not necessarily inserted into the packet itself, but can also be inserted into a higher level protocol field.

To advantage, at least one session between said source unit and said destination unit is executed in a known way by said at least one replaced unit or node, so as to constitute a test session of said at least one cache node and/or of said at least one probe. Said test session is such that, for each packet received during said test session, said manager of said at least one replaced unit or node can verify that said manager of said at least one cache node has in fact restored to it or made it possible to receive directly said financial settlement, and/or that said at least one probe has in fact transmitted to it said collected information.

In this way there is obtained a service continuity test mechanism, relating to the collection of payment tokens carried out by the cache node, and/or to the operation of the probe.

Preferentially, said data packet transmission network is a network of the Internet type.

To advantage, said service operations belong to the group including: information data supply operations, video data supply operations, audio data supply operations, cartography data supply operations, etc. This list is not exhaustive. In a general way, the present invention applies to all service and/or transmission operations able to be carried out by a cache unit.

The invention also concerns a payment system allowing the implementation of the payment process described above. The system according to the invention includes, between said source unit and said destination unit, at least one node, used as a cache node, including cache means allowing at least one cache operation to be carried out, on behalf of at least one replaced unit or node, namely said destination unit and/or at least one node, located downstream of said at least one cache node. In order also to behave like a debit node, said at least one cache node includes a said debit gateway, allowing the payment token assigned to each data packet received to be modified so as to reduce said initial value of the payment token, by an amount representing the cost of said at least one cache operation carried out, for said packet received, by said cache node. A manager of said at least one cache node has:

means for receiving on behalf of said toll center, for each packet received during said session, said financial settlement of said representative amount, and restitution means of said settlement to a manager of said at least one replaced unit or node;

or means for communicating information to a manager of said at least one replaced unit or node, so that the latter directly receives said financial settlement.

Other characteristics and advantages of the invention will emerge from reading the following description of a preferential embodiment of the invention, given purely as an example and non-restrictively, and of the appended drawings.

DETAILED DESCRIPTION OF ILLUSTRATIVE EMBODIMENTS

The invention therefore concerns a payment process and system for transmission and/or service operations carried out within a data packet transmission network.

It amounts to an improvement in token technology, the basic design of which is known to the man skilled in the art and is described in detail particularly in patent document WO 9733404 (LELEU), the text of which is inserted here for reference.

FIGS. 1 and 2, which show a particular embodiment of this known basic design, have already been discussed in the introduction of the present description.

Figure 3:
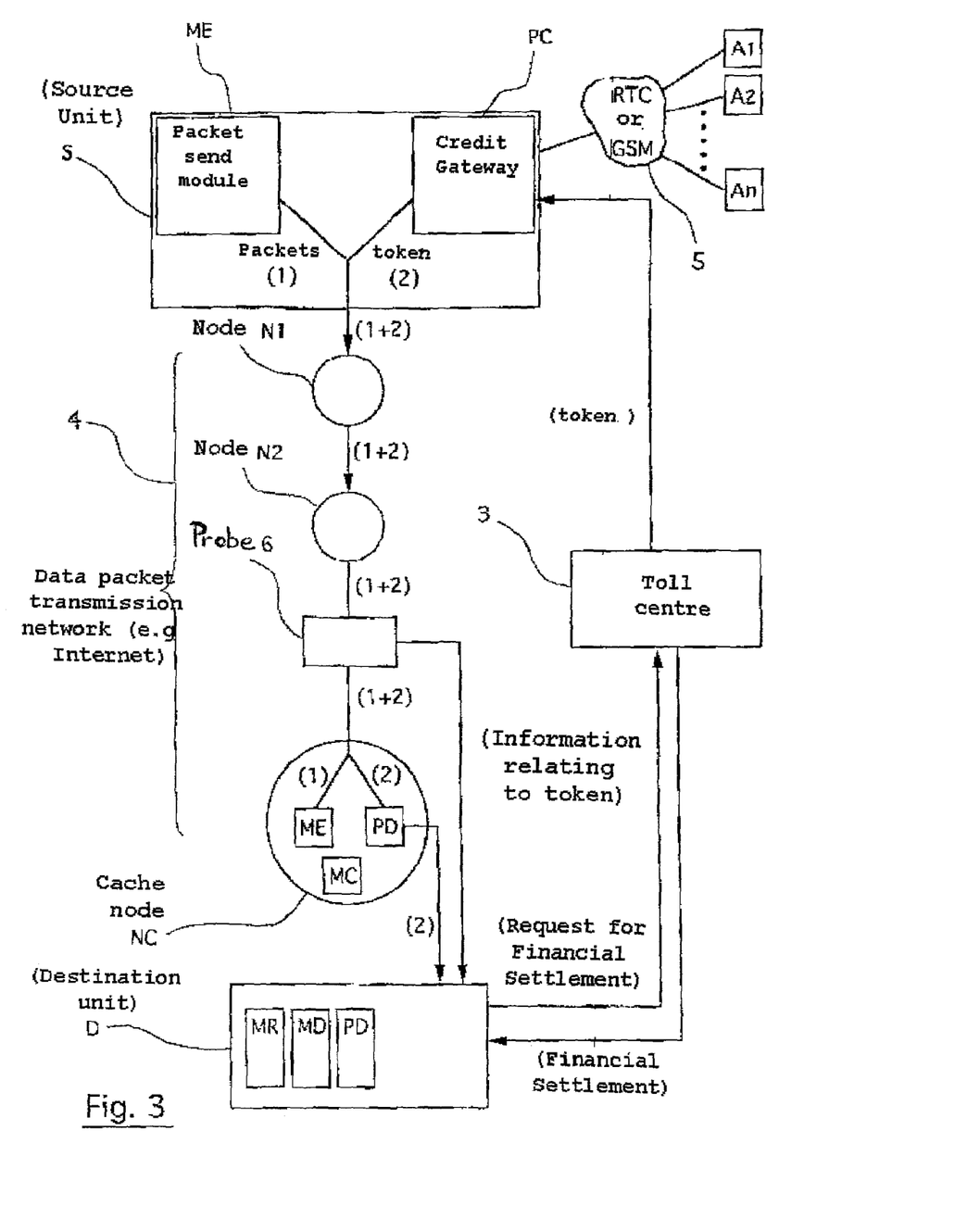
FIG. 3 shows a block diagram of a particular embodiment of the payment process and system according to the invention.
Figure 4:
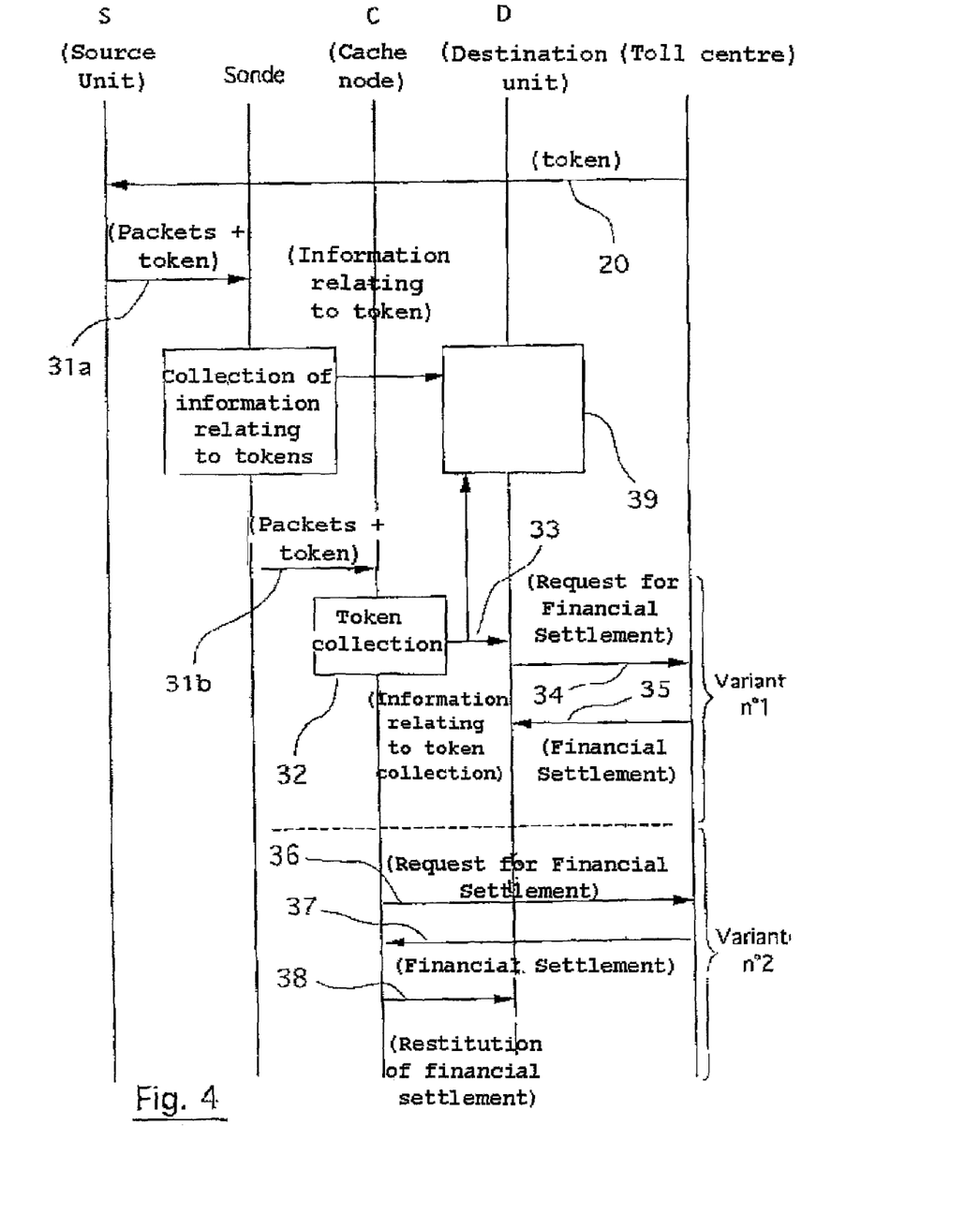
FIG. 4 shows the operation of the particular embodiment of the process and system according to the invention given in FIG. 3, through the exchanges carried out between the source unit, the probe, the cache node, the destination unit and the toll center.

A particular embodiment of the payment process and system according to the invention is now given, in relation to FIGS. 3 and 4. The elements already present in FIGS. 1 and 2 retain the same references in FIGS. 3 and 4.

In this particular embodiment, the data packet transmission network is the Internet network 4. Conventionally, it includes a plurality of network nodes, including particularly those with the references N1, N2, to NC in FIG. 3. By network node is understood any type of network unit (switch, server, router, etc.).

The source unit S is an access gateway, managed by an Internet network 4 access provider (ISP or IAP) for a plurality of subscribers $A_1$ to $A_n$. The latter are connected to the access gateway S of the access provider by another communication network 5 (STN or GSM for example). The access gateway S includes a module ME for sending data packets 1 on the Internet network 4, and a credit gateway PC allowing a payment token to be inserted in each packet 1 transmitted.

The tokens can be manufactured and recognised by means of a hashing function, by the credit gateway and the debit gateway respectively. There is in this case a certain level of security.

The destination unit D is a service server, managed by a service provider, allowing for example multimedia works to be broadcast on line. More generally, the service server makes it possible to carry out one or more of the following operations:

supplying information data, for example in the form of Web pages;

supplying video data, for example in "MPG1", "MPEG2", "MPEG4", "Real Video", "AVI" and Microsoft's "ASF", "Divx", etc. formats;

supplying audio data, for example in "au", "wav", "ra", "MP3", "MID", etc. formats;

supplying cartography data, for example in "SVG", "TMF", OptEWay's "TPF" etc. formats:

- - -

The service server D includes a data packet 1 receive module MR, and a debit gateway PD allowing the payment tokens 2 inserted in the packets 1 received by the service server D to be collected.

It should be noted that the debit gateway can extract the tokens and form a billing ticket (or CDR, for "Call Detail Record") when the (service in the present case) session ends. The credit and debit gateways thus maintain the notion of a session during the service connection time. They can condition the final allocation of tokens to the content provider on successful conclusion of the connection (of the TCP type). It is in fact a mechanism of the transactional type, with a roll-back function.

The service server D additionally includes means MD for broadcasting multimedia works in response to requests which it receives.

It is pre-supposed that one of the Internet network nodes is a cache node NC in respect of the service server D. The cache node is for example a "proxy cache" server, managed by the access provider, as operator of one of the interconnected autonomous systems forming all together the Internet network (see patent document WO 9733404 (LELEU)). The cache node stores a sub-set of the works broadcast by the service server D and includes cache means MC allowing it to respond alone to a request concerning one of the works of this sub-set (without passing on the request to the service server D). Furthermore, the cache node NC includes a data packets 1 receive module MR, and a debit gateway PD allowing the payment tokens 2 inserted in the packets 1 received by the cache node to be collected.

By way of illustration, it is pre-supposed in the remainder of the description that the subscriber $A_1$ sends a request to the service server D, via the access provider's access gateway S, so as to receive on line a given work. It is pre-supposed that the cache node NC can respond to this request, without passing it on to the service server D of the service provider.

The operation of the system according to the invention is now given through this example and in relation to FIG. 4. It is pre-supposed that previously, the access gateway S (i.e. the access provider) has obtained (20) from a Toll center 3 a plurality of payment tokens 2, each having an initial value representing a credit of monetary units.

The packet send module ME included in the access gateway S generates (at least) one data packet containing the request of the subscriber $A_1$. The credit gateway PC included in the access gateway S inserts into this packet 1 a payment token 2. Alternatively, the token 2 is inserted into a higher level encapsulating packet structure (for example HTTP). The initial value of the payment token is in the present example equal to the amount representing the cost of the sole service operation to be carried out. The access gateway S sends (31*a*, 31*b*) on the Internet network 4 the packet 1 containing the token 2, intended for the service server D.

The packet 1 does not reach as far as the latter since, in the cache node NC, it is received by the receive module MR then processed by the cache means MC. Furthermore, the debit gateway PD, also included in the cache node NC, collects (32) the payment token 2. It is in return for the latter that a financial settlement will be able to be obtained from the toll center 3.

According to a first variant, the access provider (as manager of the cache node NC) provides (33) to the service provider information relating to the collection of the token. From this information, the service provider requests from (34) and receives from (35) the toll center 3 a financial settlement of the amount representing the cost of the sole service operation carried out.

According to a second variant, the access provider (as manager of the cache node NC) requests from (36) and receives from (37) the toll center 3 a financial settlement of the amount representing the sole cost of the service operation carried out. Then, the access provider (38) cedes back (38) this financial settlement to the service provider.

Optionally, a token collection control mechanism is implemented. As shown in FIGS. 3 and 4, a probe 6 is placed, within the Internet network 4, downstream of the access gateway S and the cache node NC. Each packet 1 then passes through this probe 6, which allows the latter to collect information relating to the tokens 2 contained in these packets. To be more exact, the probe 6 collects information 7 relating to the amount representing the cost of the (cache) operation due to be carried out by the cache node. The information 7 collected by the probe is transmitted to the service provider. Subsequently, by comparison of the information provided by the probe with the information provided by the access provider (as manager of the cache node), the service provider can control (39) the collection (32) of payment tokens carried out by the access provider.

Also optionally, a service continuity test mechanism is implemented, by running, possibly in an iterative way, a test session between the access gateway S and the service server D. In order to confer on it its test character, this session is particular in that it is executed in a known way by the service server D. For example, it is executed at a pre-set time and with a pre-set payment token initial value. Thus, for each packet received during this test session, the service provider can verify that the access provider (as manager of the cache node) has in fact restored to him (variant 2) or made it possible to receive directly (variant 1) the financial settlement. He can also verify that the information collected and transmitted by the probe is correct.

It should be noted that the source unit used during the session may be either a dedicated unit (specific test unit), or a "conventional" source unit used exceptionally for tests.

In the particular embodiment shown in FIGS. 3 and 4, only the source unit S includes a credit gateway PC and only the destination unit D includes a debit gateway PD. It is clear however that the present invention applies also if one or more nodes, called credit nodes, each include a credit gateway PC and/or if one or more nodes, called debit nodes, each include a debit gateway PD.

Furthermore, in the preceding, the operation to be paid for is a service operation. However, the present invention applies also to the payment of transport operations.

It should be noted that a same payment token can allow the payment of transmission operations and of service operations. In this case, the initial value of the payment token is equal to the plurality of the amounts representing the costs of the different operations.

It is not mandatory for the unit replaced by the cache node NC to be the destination unit D. It may be a network node located downstream of the cache node.

What is claimed is:

1. A payment process for operations carried out within a data packet transmission network, during a session between a source unit and a destination unit interconnected via at least one node of said network, at least one of said destination unit or said at least one node being used by at least one operator or at least one service provider, said process being such that:
   in at least one of said source unit or the at least one node, called a credit node, a credit gateway assigns to each data packet sent by said source unit a payment token which has an initial value representing a credit of monetary units previously acquired from a toll center;
   in at least one of said destination unit or the at least one node, called a debit node, located downstream of said at least one credit node, a debit gateway modifies the payment token assigned to each data packet received, so as to reduce said initial value of the payment token, by an amount representing the cost of the operations to be carried out, for said received packet, by at least one of said destination unit or the at least one debit node;
   at least one of said destination unit or each debit node, in which is included said debit gateway, receives from said toll center, for each packet received during said session, financial settlement of said representative amount;
   characterised in that, between said source unit and said destination unit at least one node is used as a cache node, including caching that allows at least one cache operation to be carried out, on behalf of at least one replaced unit or node, namely at least one of said destination unit or at least one node, located downstream of said at least one cache node,
   in that said at least one cache node also behaves like a debit node, and includes said debit gateway modifying the payment token assigned to each data packet received, so as to reduce said initial value of the payment token, by an amount representing the cost of said at least one cache operation carried out, for said packet received, by said cache node,
   in that a manager of said at least one cache node:
      receives from said toll center, for each packet received during said session, said financial settlement of said representative amount and restores it to a manager of said at least one replaced unit or node, or allows a manager of said at least one replaced unit or node to receive said financial settlement directly.

2. A process according to claim 1, characterised in that at least one probe is placed upstream of said at least one cache node, making it possible to collect, in each packet reaching said at least one cache node, information relating to the amount representing the cost of said at least one cache operation to be carried out, for said packet, by said at least one cache node, and in that said manager of said at least one replaced unit or node receives said information collected by said at least one probe, so as to get said amount representing the costs of the cache operations carried out by said at least one cache node for each packet received during said session.

3. A process according to claim 2, characterised in that at least one session between said source unit and said destination unit is executed by said at least one replaced unit or node, so as to constitute a test session of said at least one cache node or of said at least one probe, and in that said test session is such that, for each packet received during said test session, said manager of said at least one replaced unit or node can verify:

that said manager of said at least one cache node has in fact restored to it or made it possible to receive directly said financial settlement;

or that said at least one probe has in fact transmitted to it said collected information.

4. A process according to claim 2, characterised in that each payment token is assigned to a given packet by insertion of said payment token in said packet or in at least one higher level encapsulating structure of said packet.

5. A process according to claim 2, characterised in that said data packet transmission network is a Internet type network.

6. A process according to claim 2, characterised in that said service operations belong to the group including:
 information data supply operations;
 video data supply operations;
 audio data supply operations;
 cartography data supply operations.

7. A process according to claim 2, characterised in that said source unit is used by a provider of access to said data packet transmission network, and allows said access to be provided to at least one subscriber to said access provider.

8. A process according to claim 7, characterised in that each payment token is assigned to a given packet by insertion of said payment token in said packet or in at least one higher level encapsulating structure of said packet.

9. A process according to claim 8, characterised in that at least one session between said source unit and said destination unit is executed by said at least one replaced unit or node, so as to constitute a test session of said at least one cache node or of said at least one probe, and in that said test session is such that, for each packet received during said test session, said manager of said at least one replaced unit or node can verify:

that said manager of said at least one cache node has in fact restored to it or made it possible to receive directly said financial settlement;

or that said at least one probe has in fact transmitted to it said collected information.

10. A process according to claim 7, characterised in that at least one session between said source unit and said destination unit is executed by said at least one replaced unit or node, so as to constitute a test session of said at least one cache node or of said at least one probe, and in that said test session is such that, for each packet received during said test session, said manager of said at least one replaced unit or node can verify:

that said manager of said at least one cache node has in fact restored to it or made it possible to receive directly said financial settlement;

or that said at least one probe has in fact transmitted to it said collected information.

11. A process according to claim 10, characterised in that at least one session between said source unit and said destination unit is executed by said at least one replaced unit or node, so as to constitute a test session of said at least one cache node or of said at least one probe, and in that said test session is such that, for each packet received during said test session, said manager of said at least one replaced unit or node can verify:

that said manager of said at least one cache node has in fact restored to it or made it possible to receive directly said financial settlement;

or that said at least one probe has in fact transmitted to it said collected information.

12. A process according to claim 1, characterised in that each payment token is assigned to a given packet by insertion of said payment token in said packet or in at least one higher level encapsulating structure of said packet.

13. A process according to claim 12, characterised in that at least one session between said source unit and said destination unit is executed by said at least one replaced unit or node, so as to constitute a test session of said at least one cache node or of said at least one probe, and in that said test session is such that, for each packet received during said test session, said manager of said at least one replaced unit or node can verify:

that said manager of said at least one cache node has in fact restored to it or made it possible to receive directly said financial settlement;

or that said at least one probe has in fact transmitted to it said collected information.

14. A process according to claim 1, characterised in that at least one session between said source unit and said destination unit is executed by said at least one replaced unit or node, so as to constitute a test session of said at least one cache node or of said at least one probe, and in that said test session is such that, for each packet received during said test session, said manager of said at least one replaced unit or node can verify:

that said manager of said at least one cache node has in fact restored to it or made it possible to receive directly said financial settlement;

or that said at least one probe has in fact transmitted to it said collected information.

15. A process according to claim 1, characterised in that said data packet transmission network is a Internet type network.

16. A process according to claim 1, characterised in that said service operations belong to the group including:
 information data supply operations;
 video data supply operations;
 audio data supply operations;
 cartography data supply operations.

17. A process according to claim 1, characterised in that said source unit is used by a provider of access to said data packet transmission network, and allows said access to be provided to at least one subscriber to said access provider.

18. A process according to claim 17, characterised in that each payment token is assigned to a given packet by insertion of said payment token in said packet or in at least one higher level encapsulating structure of said packet.

19. A process according to claim 17, characterised in that at least one session between said source unit and said destination unit is executed by said at least one replaced unit or node, so as to constitute a test session of said at least one cache node or of said at least one probe, and in that said test session is such that, for each packet received during said test session, said manager of said at least one replaced unit or node can verify:

that said manager of said at least one cache node has in fact restored to it or made it possible to receive directly said financial settlement;

or that said at least one probe has in fact transmitted to it said collected information.

20. A payment system for operations carried out within a data packet transmission network, during a session between a source unit and a destination unit interconnected via at least one node of said network, said destination unit or said at least one node being used by at least one operator or at least one service provider, said system being such that:

said source unit or at least one node, called a credit node, includes a credit gateway making it possible to assign to each data packet sent by said source unit a payment token which has an initial value representing a credit of monetary units previously acquired from a toll center;

said destination unit or at least one node, called a debit node, located downstream of said at least one credit node, includes a debit gateway making it possible to modify the payment token assigned to each data packet received, so as to reduce said initial value of the payment token, by an amount representing the cost of the operations to be carried out, for said received packet, by said destination unit or said at least one debit node;

said destination unit or each debit node, in which is included a said debit gateway, receives from said toll center, for each packet received during said session, a financial settlement of said representative amount;

characterised in that, between said source unit and said destination unit at least one node, used as a cache node, includes caching that allows at least one cache operation to be carried out, on behalf of at least one replaced unit or node, namely said destination unit or at least one node, located downstream of said at least one cache node, in that, in order also to behave like a debit node, said at least one cache node includes a said debit gateway, allowing the payment token assigned to each data packet received to be modified so as to reduce said initial value of the payment token, by an amount representing the cost of said at least one cache operation carried out, for said packet received, by said cache node, and in that a manager of said at least one cache node has:

circuitry for receiving on behalf of said toll center, for each packet received during said session, said financial settlement of said representative amount, and restitution circuitry of said settlement to a manager of said at least one replaced unit or node;

or circuitry for communicating information to a manager of said at least one replaced unit or node, so that the latter directly receives said financial settlement.

* * * * *